(12) United States Patent
Laun

(10) Patent No.: US 12,025,478 B2
(45) Date of Patent: Jul. 2, 2024

(54) DEVICE AND METHOD FOR PROVIDING A SIGNAL COLOR FOR A FILL LEVEL MEASURING DEVICE

(71) Applicant: VEGA Grieshaber KG, Wolfach (DE)

(72) Inventor: Robert Laun, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 512 days.

(21) Appl. No.: 17/240,434

(22) Filed: Apr. 26, 2021

(65) Prior Publication Data

US 2021/0341316 A1  Nov. 4, 2021

(30) Foreign Application Priority Data

Apr. 29, 2020  (WO) ................ PCT/EP2020/061905

(51) Int. Cl.
*G01D 7/00* (2006.01)
*G01F 15/063* (2022.01)

(52) U.S. Cl.
CPC ........... *G01D 7/005* (2013.01); *G01F 15/063* (2013.01)

(58) Field of Classification Search
CPC ....... G01D 7/005; G01F 15/063; G01F 23/00; G01F 23/804
See application file for complete search history.

(56) References Cited

U.S. PATENT DOCUMENTS

| | | | |
|---|---|---|---|
| 2005/0030161 A1 | 2/2005 | Dittrich | |
| 2009/0088987 A1 | 4/2009 | Lyon | |
| 2015/0310678 A1 | 10/2015 | Ito | |
| 2018/0026942 A1* | 1/2018 | De Ligt | H04L 61/35 709/245 |
| 2019/0137357 A1 | 5/2019 | Maier et al. | |
| 2019/0188008 A1* | 6/2019 | Schmoetzer | G06F 9/44505 |
| 2020/0143649 A1* | 5/2020 | Coonley | G08B 17/08 |
| 2020/0305006 A1* | 9/2020 | Chen | H04W 16/18 |
| 2021/0253417 A1* | 8/2021 | Grose | B60P 3/2265 |

FOREIGN PATENT DOCUMENTS

| | | |
|---|---|---|
| DE | 10 2011 002 038 B3 | 3/2012 |
| DE | 10 2017 123 820 A1 | 4/2019 |
| DE | 10 2018 200 261 A1 | 7/2019 |
| EP | 1 486 841 A1 | 12/2004 |
| JP | 2010-126892 A | 6/2010 |
| WO | WO 2005/078475 A1 | 8/2005 |
| WO | WO 2020/028941 A1 | 2/2020 |
| WO | WO-2021209157 A1 * | 10/2021 ............. G01F 23/14 |

OTHER PUBLICATIONS

Extended European Search Report dated Sep. 9, 2021 in European Patent Application No. 21169217.3, 11 pages.
European Office Action mailed on May 16, 2024, issued in EP 21 169 217.3 filed on Apr. 19, 2021, total 10 pages, with machine-generated English Translation.

\* cited by examiner

*Primary Examiner* — Christopher E Mahoney
(74) *Attorney, Agent, or Firm* — Oblon, McClelland, Maier & Neustadt, L.L.P.

(57) ABSTRACT

A device for providing at least one signal color for a level gauge is provided, the device including: a parameterization device configured to provide a signal color for a network of level measuring devices; and a transmission device configured to transmit the provided signal color as signal color data to the network of level measuring devices. A method of providing a signal color for a level measuring device and a nontransitory computer-readable storage medium are also provided.

14 Claims, 2 Drawing Sheets

DEVICE AND METHOD FOR PROVIDING A SIGNAL COLOR FOR A FILL LEVEL MEASURING DEVICE

CROSS-REFERENCE TO RELATED APPLICATION

This application claims priority to International Patent Application No. PCT/EP2020/061905, filed Apr. 29, 2020, which is incorporated herein by reference in its entirety.

TECHNICAL FIELD

The present invention relates generally to display codes for level measuring devices. In particular, the present invention relates to a device for providing a signal color for a level measuring device, a method for providing a signal color for a level measuring device, and a corresponding data structure.

BACKGROUND

DE 10 2018 200 261 A1 describes a display unit for a level measuring device, pressure gauge, flow meter, or point level sensor with a coding unit and a display. The coding unit converts measurement data and/or status data of the measuring device or sensor into a two-dimensional graphic code. The display is set up to show the graphical code in such a way that it can be captured by a camera unit of an external terminal, for example a smartphone.

SUMMARY

It is an object of the invention to specify or provide a device that can display states and network hierarchies for level measuring devices as quickly as possible and without errors.

This object is solved by the features of the independent patent claims. Further embodiments of the invention result from the dependent claims and the following description of embodiments.

A first aspect of the invention relates to a device for providing a signal color for a level measuring device, the device comprising: a parameterization device configured to provide a signal color for a network or array of level measuring devices; and a transmission device configured to transmit the provided signal color as signal color data to the network of level measuring devices.

Advantageously, the present invention enables a method to be provided by which a consistent indication of system status is provided by uniform colored illumination of the devices in a master-slave operation. In other words, the present invention advantageously enables a network hierarchy for level measurement devices to be a master-slave configuration, or a star configuration, or a cascaded network structure, the network hierarchy may involve control.

Furthermore, the network hierarchy for level measuring devices can be asymmetrical, in the transmit call, receive call, such as master-slave configuration, or symmetrical, in the contention mode.

Advantageously, the present invention allows colored status indicators of individual devices to be represented by, for example, an illuminated ring or colored backlighting.

Advantageously, the present invention allows that when multiple devices are coupled together via a bus—wired or wireless—the result being a device system with multiple devices performing a measurement task together and an overall state that is usually determined by the master.

Since the master is not necessarily located in a position that can be seen by the operator, or it is not obvious which devices are all involved in this system, it would make sense to have all devices that together fulfill a measuring task light up with the same color.

The present invention has several advantages: all level measurement devices involved in the measurement task and illuminated in the same color are easily distinguishable from other devices.

The present invention has the further advantage that in the event of a fault, all devices are marked with the fault color and it is immediately apparent which system is faulty and an effective and safe display coding for level measuring devices is provided.

The present invention has the further advantage that if the level measuring device is the device that caused the fault, this can be indicated by an additional flashing or changing color—system color and/or fault color—so that fault localization by the user is visually possible.

To achieve this, for example, the current system color is transmitted cyclically to the master as well as to all participating slaves according to an embodiment example of the present invention.

The present invention advantageously provides a consistent and uniform colored status display of the field devices when connected, for example in master-slave operation.

According to one embodiment of the invention, the parameterization device is configured to provide the signal color as a color for identifying a master-slave network of the level measuring devices.

According to one embodiment of the invention, the transmitting device is configured to transmit the signal color data synchronously, asynchronously, or cyclically.

According to one embodiment of the invention, the parameterization device is further configured to provide an error color for the group of level measuring devices and the transmission device is further configured to transmit the provided error color as error color data to the group of level measuring devices.

According to one embodiment of the invention, the transmitting device is configured to transmit the error color data synchronously, asynchronously, or cyclically.

According to one embodiment of the invention, the signal color data for a level measuring device are suitable for indicating that the level measuring device belongs to the group of level measuring devices.

A further aspect of the invention relates to a level measuring device for determining a level of a medium, the level measuring device comprising: receiving means adapted to receive color data from a device according to one of the preceding embodiments and the first aspect, respectively.

According to one embodiment of the invention, the level measuring device further comprises: a display device which is configured to display the received signal color data and/or error color data and to output a signal color and/or an error color.

According to one embodiment of the invention, the display device is formed as an illuminated display or as a backlight of a display of the level measuring device. The display device may comprise an electrical illuminant such as an LED or a segment display or a matrix display.

According to one embodiment of the invention, the display device is configured to be used as a NAMUR signal display.

Another aspect of the invention relates to a method of providing a signal color for a level measurement device, the method comprising the steps of: providing a signal color to a network of level measurement devices; and transmitting the provided signal color as signal color data to the network of level measurement device.

According to one embodiment of the invention, the signal color is provided as a color for identifying a master-slave network of the level measurement devices.

According to one embodiment of the invention, the signal color data is transmitted synchronously, asynchronously or cyclically.

According to one embodiment of the invention, an error color is provided for the network of level measurement devices and the provided error color is transmitted as error color data to the network of level measurement devices.

According to one embodiment of the invention, the error color data is transmitted synchronously, asynchronously, or cyclically.

Another aspect of the invention relates to a data structure for data transmission between a device according to any one of the preceding embodiments and at least two level measurement devices, the data structure comprising: signal color data and/or error color data.

The features described above and below can also be implemented in other gauge circuits. At this point, it should be noted that with regard to the method described features can be implemented by the elements of the gauge circuits and different fill level radar systems.

For example, radiometric measuring systems can be used as level radar systems, which determine the level of a container via the measured variables density, limit level, or mass flow.

The described embodiments and further developments can be combined with each other as desired.

Other possible embodiments, further embodiments and implementations of the present invention also include combinations, not explicitly mentioned, of features of the present invention described previously or hereinafter with respect to the embodiments.

The accompanying drawings are intended to provide a further understanding of embodiments of the present invention.

The accompanying drawings illustrate embodiments and, in connection with the description, serve to explain concepts of the present invention.

Other embodiments and many of the advantages mentioned will result with regard to the figures of the drawings. The elements shown in the figures of the drawings are not necessarily shown to scale with respect to each other.

DETAILED DESCRIPTION OF EMBODIMENTS

In the figures of the drawings, identical reference signs designate identical or functionally identical elements, parts, components or process steps, unless otherwise indicated.

Figure 1:
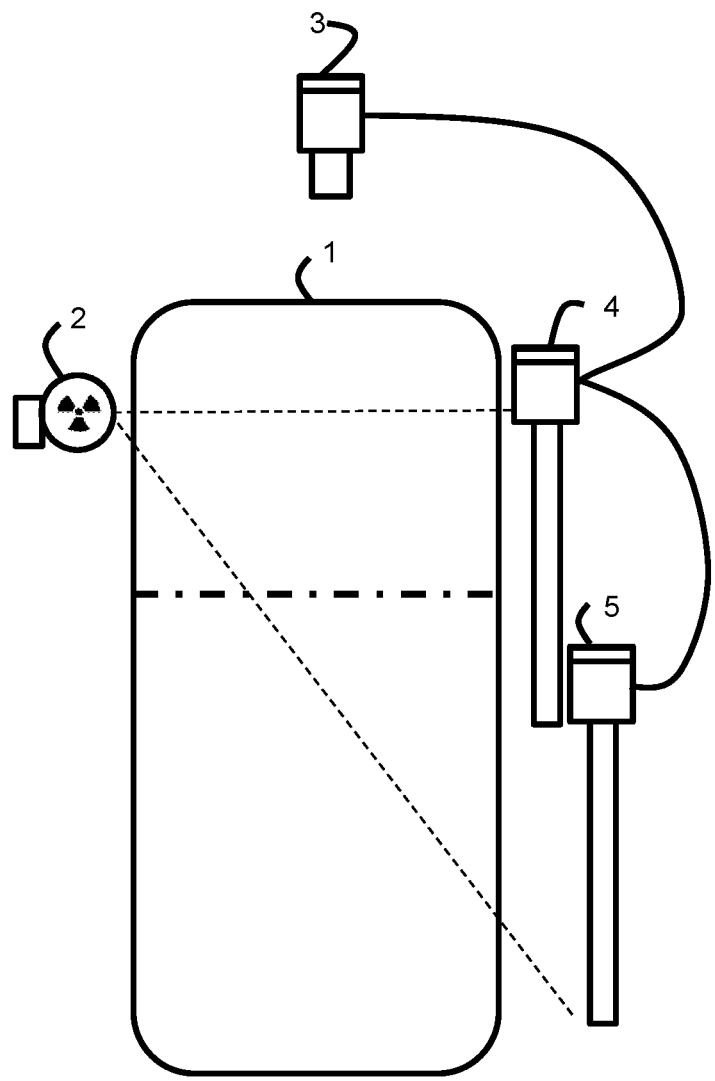
FIG. 1 shows a device for providing a signal color for a level measuring device according to an embodiment.

FIG. 1 shows a device for providing a signal color for a level measuring device according to an embodiment.

The term "parameterization" as used herein may be understood to refer to, for example, any customizing, initialization, or calibration activity that sets or determines color parameters or values for a level measuring device or any network of level measuring devices.

According to an embodiment, a container 1 is irradiated by a radioactive source 2, as shown in FIG. 1.

According to an embodiment, an external radiation detection sensor 3 is formed with an illuminant, wherein the illuminant may be formed as an illuminated ring, and emits approximately a violet signal color.

According to an embodiment, a level measuring device 4 may be designed as a slave of a master-slave arrangement and may be formed with a luminous means, wherein the luminous means may be designed as a luminous ring, and may emit a violet signal color, for example.

According to an embodiment, a level measuring device 5 may be designed as a master of a master-slave arrangement and may be formed with a luminous means, wherein the luminous means may be designed as a luminous ring, and may emit a violet signal color, for example.

Figure 2:
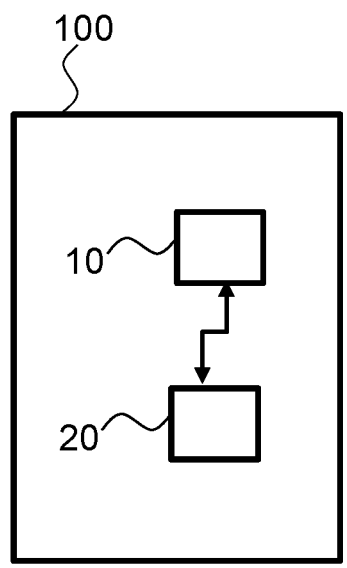
FIG. 2 shows a device for providing a signal color for a level measuring device according to an embodiment.

FIG. 2 shows a device for providing a signal color for a level measuring device according to an embodiment.

The device 100 for providing a signal color to a level measuring device includes a parameterization device 10 and a transmission device 20.

The parameterization device 10 is designed to provide a signal color for a network of level measurement devices.

The transmitting device 20 is designed to transmit the provided signal color as signal color data to the network of level measuring devices.

In an embodiment, it is provided that the level of a container is determined using a plurality of PROTRAC devices.

The term "PROTRAC" refers to devices for level detection with radiometry. Radiometric level detection works with a radiometric source that emits bundled gamma radiation. The radiation is received by a detector on the opposite side of the vessel. If the radiation is blocked by the product, the detector receives less or no radiation. These intensity changes are passed on as signals by a relay.

For this purpose, three SOLITRAC devices (summation) and another device for external radiation detection are interconnected according to another embodiment.

The term "SOLITRAC" refers to devices or radiometric sensors with PVT rod detector for continuous measurement of liquids and bulk solids. It is suitable for level measurement at extreme process temperatures, with critical product properties or of aggressive media, thus ideal for use in cylindrical vessels, reactors, autoclaves, separators, and mixing vessels.

In an embodiment, it is provided that electrical illuminants will illuminate in a particular color in the normal state.

For example, if a particular connection is broken, for example a data transmission connection from the master to a summing slave of the master-slave arrangement of level measuring devices, this is detected by the system and the master of the master-slave arrangement of level measuring devices goes into fault or fault mode and the display changes color to, for example, a color value of "red", according to a further embodiment.

In an embodiment, it is provided that this new color value is transmitted to the other devices still present on the bus via data transmission, and the field devices are designed to also change the color to a different hue or to a different color value, such as red.

In an embodiment, it is provided that on the liquid container, for example, illuminants of three level measuring devices would light up with the color value "red" and a detection of the faulty measurement would be achieved more reliably than if this lighting up were indicated only by a single illuminant of a level measuring device.

In an embodiment, it is provided that the level measuring device used as master or its electrical illuminant can additionally flash alternately with the color value "red" and with the color value "violet". This makes it advantageously recognizable that the master has caused the error.

The level measuring device that is no longer on the bus would continue to light up with the color value "violet" and it would be recognizable that it can no longer be reached by the master.

In an embodiment, it is provided that all level gauges in the master/slave system light up with the color value "violet", to indicate the signal color.

In an embodiment, it is provided that the extraneous radiation device detects extraneous radiation and is adapted to place the equipment in a corresponding fault state and to display a fault color or fault color value accordingly.

In an embodiment, it is provided that the extraneous radiation device flashes in an error color. This enables it to be made apparent that extraneous radiation is present or has acted on a sensor of the level measuring device.

Figure 3:
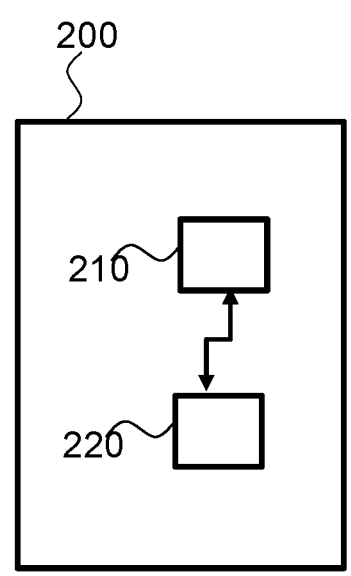
FIG. 3 shows a level measuring device according to an embodiment.

FIG. 3 shows a level measuring device according to an embodiment.

The level measuring device 200 for determining a level of a medium includes a receiving device 210 and a display device 220.

The receiving device 210 is adapted to receive the color data from a device 100.

The display device 220 is adapted to display the received signal color data and/or error color data, and to output a signal color and/or an error color.

For example, the display device 220 is adapted to be used as a NAMUR signal display.

The term NAMUR refers to the "Standards Working Group for Measurement and Control Technology in the Chemical Industry".

The association primarily supports the concerns of the process industry with regard to standardization, devices, measuring methods or the like. The term "NAMUR signal display", within the meaning of the description of the present patent application, further includes electronic components designed to display colors defined or standardized according to NAMUR and/or to output colors or symbols defined or standardized according to NAMUR.

Furthermore, the term "NAMUR signal display" includes electronic display components that are to be operated with defined minimum or maximum current or power values.

Furthermore, the term "NAMUR signal display" covers electronic display components that can display signal levels and the failure information of digital measuring transducers with analog output signal defined or standardized according to NAMUR, e.g., failure of the measuring transducer, failure in connecting lines, failure of auxiliary energies, etc. The failure information states that there is a failure in the measuring system.

Figure 4:
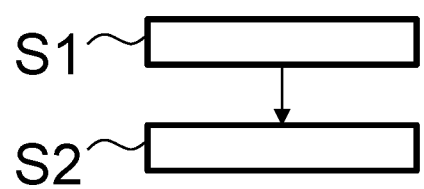
FIG. 4 shows a flow diagram of a method for providing a signal color for a level measuring device according to an embodiment.

FIG. 4 a flow diagram a flow diagram of a method for providing a signal color for a level measuring device.

The method for providing a signal color for a level measuring device has the following method steps:

As a first step of the process, a signal color S1 is provided for a network of level measuring devices.

As a second step of the process, S2 of the provided signal color is transmitted as signal color data to the network of level measuring devices.

Finally, it should be noted that "comprising" and "including" do not exclude other elements or steps, and the indefinite articles "an" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A device for providing at least one signal color to each level measuring device of a network of level measuring devices, the device comprising:
    a parameterization device configured to provide a signal color for each level measuring device of the network of level measuring devices; and
    a transmitting device configured to transmit the provided signal color as signal color data to each level measuring device of the network of level measuring devices,
    wherein the signal color data for each level measuring device of the network of level measuring devices is configured to indicate an affiliation of each level measuring device to the network of level measuring devices.

2. The device according to claim 1, wherein the parameterization device is further configured to provide the signal color as a color for identifying a master-slave network of the level measuring devices.

3. The device according to claim 1, wherein the transmitting device is further configured to transmit the signal color data synchronously, asynchronously, or cyclically.

4. The device according to claim 1,
    wherein the parameterization device is further configured to provide at least one error color for the network of level measuring devices, and
    wherein the transmitting device further configured to transmit the provided at least one error color as error color data to the network of level measuring devices.

5. The device according to claim 4, wherein the transmitting device is further configured to transmit the error color data synchronously, asynchronously, or cyclically.

6. A level measuring device for determining a level of a medium, the level measuring device comprising:
    a receiving device configured to receive color data from a device according to claim 1.

7. The level measuring device according to claim 6, further comprising:
    a display device configured to display the received signal color data and/or error color data and to output a signal color and/or an error color.

8. The level measuring device according to claim 6, wherein the display device is formed as a luminous display or as a background illumination of a display of the level measuring device.

9. A method of providing a signal color for a level measuring device, the method comprising the following steps:
    providing at least one signal color for each level measuring device of a network of level measuring devices; and
    transmitting the provided signal color as signal color data to each level measuring device of the network of level measuring devices, wherein the signal color data for each level measuring device of the network of level measuring devices is configured to indicate an affiliation of each level measuring device to the network of level measuring devices.

10. The method according to claim 9, wherein the at least one signal color is provided as a color to identify a master-slave network of the level measuring devices.

11. The method according to claim 9, where the signal color data is transmitted synchronously, asynchronously, or cyclically.

12. The method according to claim 9,
wherein at least one error color is provided for the network of level measuring devices, and
wherein the provided at least one error color is transmitted as error color data to the network of level measuring devices.

13. The method according to claim 12, wherein the error color data is transmitted synchronously, asynchronously, or cyclically.

14. A nontransitory computer-readable storage medium comprising instructions stored therein, which, when executed by a computer, cause the computer to perform the steps of the method according to claim 9.

* * * * *